(12) United States Patent
Savit

(10) Patent No.: US 7,996,842 B2
(45) Date of Patent: Aug. 9, 2011

(54) COMPUTER RESOURCE MANAGEMENT FOR WORKLOADS OR APPLICATIONS BASED ON SERVICE LEVEL OBJECTIVES

(75) Inventor: Jeffrey B. Savit, River Edge, NJ (US)

(73) Assignee: Oracle America, Inc., Redwood City, CA (US)

( * ) Notice: Subject to any disclaimer, the term of this patent is extended or adjusted under 35 U.S.C. 154(b) by 1517 days.

(21) Appl. No.: 11/393,045

(22) Filed: Mar. 30, 2006

(65) Prior Publication Data

US 2007/0234365 A1  Oct. 4, 2007

(51) Int. Cl.
    *G06F 9/46* (2006.01)
(52) U.S. Cl. .......................... 718/104; 718/103
(58) Field of Classification Search .................. None
    See application file for complete search history.

(56) References Cited

U.S. PATENT DOCUMENTS

| | | | |
|---|---|---|---|
| 6,857,020 B1 * | 2/2005 | Chaar et al. | 709/226 |
| 7,140,020 B2 * | 11/2006 | McCarthy et al. | 718/104 |
| 7,451,183 B2 * | 11/2008 | Romero et al. | 709/206 |
| 2005/0114429 A1 | 5/2005 | Caccavale | |
| 2005/0240935 A1 | 10/2005 | Ramanathan | |
| 2005/0256946 A1 | 11/2005 | Childress et al. | |
| 2005/0256971 A1 | 11/2005 | Colrain et al. | |
| 2006/0031287 A1 | 2/2006 | Ulrich et al. | |
| 2006/0069780 A1 | 3/2006 | Batni | |
| 2006/0072581 A1 | 4/2006 | Olariv et al. | |
| 2006/0080446 A1 | 4/2006 | Bahl | |

* cited by examiner

*Primary Examiner* — Meng A An
*Assistant Examiner* — Eric C Wai
(74) *Attorney, Agent, or Firm* — Marsh Fischmann & Breyfogle LLP; Kent A. Lembke

(57) ABSTRACT

A resource allocation method and system for efficiently allocating compute resources. The method includes providing a workload manager and installing a workload in the computer system. During the installing, a service level goal for the workload is provided to the workload manager, and the workload manager assigns a first resource allocation for the compute resources to the workload. Then, a service level being achieved for the workload is determined in the compute resources. Based on results of the comparing, the workload manager reallocates the compute resource with the workload manager including assigning a second resource allocation for the compute resources to the workload. The workload may be made up of one or more applications running on the compute resources over multiple OS instances. The installing of the workload includes the application interfacing with the workload manager to provide the service level goal during installation.

15 Claims, 5 Drawing Sheets

COMPUTER RESOURCE MANAGEMENT FOR WORKLOADS OR APPLICATIONS BASED ON SERVICE LEVEL OBJECTIVES

BACKGROUND OF THE INVENTION

1. Field of the Invention

The present invention relates, in general, to management and allocation of resources within a computer system (i.e., "compute resources") and to tools often referred to as workload managers or resource managers, and, more particularly, to software, hardware, systems, and methods for more effectively managing how compute resources are provided to applications, processes, and/or workloads running in a computer system and particularly in open and/or distributed systems and over multiple operating system (OS) instances.

2. Relevant Background

An ongoing problem in the computer industry is how to manage or allocate computer system or compute resources to running processes so as to more fully utilize the available system resources while providing sufficient computer system resources for application performance requirements. This is a particular problem for open systems, such as Solaris-based systems, and servers or machines are often run at low utilization, which increases the costs of operating the computer system. For example, a common response to a process, such as an e-commerce or web server application, not running at a desired speed is to buy and install more servers, memory, I/O, or other devices, e.g., to buy more equipment or compute capacity or resources. Similarly, traditional distributed systems manage resources by providing a separate server for each application being run by a customer or user. Every server is then sized for peak workloads, which typically results in very low average utilization rates for each server. There are much unused compute resources, such as central processor capacity, I/O, memory, and the like, because each application has peaks and valleys in its server or other compute resources utilization or "load." Combining such applications or workloads is often not useful as peaks and valleys may overlap, which results in the server or compute resources being sized for an even larger peak furthering the underutilization of resources problem. Mixing workloads has become more practical recently as systems have become open and distributed and employ scalable hardware (such as CPU, memory, I/O, and the like from a pool or the like), scalable operating systems, and resource management technologies.

Numerous resource manager tools are available, but none has been totally successful in meeting the desired resource or machine utilization or the user demand for flexible controls and settings based on user input and usage. For example, resource managers are available from Microsoft Corporation, VMWare, Inc., Hewlett Packard, Sun Microsystems, Inc., IBM, and other companies, and there are also Linux-based resource management tools. Some of these tools allow the management of CPU, RAM, and I/O according to various parameters such as based on user or time of day (i.e., differing policies or operating parameters based on day time usage or night time usage). Most of these tools have undesirable limitations that have hindered their effective use in open or distributed computer systems and networks. For example, many resource management tools are specific or tied to a particular machine or physical CPU and are not useful across clusters or across multiple operating system instances. However, the primary deficiency of existing resource management tools is that they allocate resources on the basis of resource consumption, not on the basis of how much application work has been accomplished.

Some efforts have been made to implement priorities with resources being made more readily available to higher priority tasks (e.g., processes or jobs given more relative "shares" based on their importance), but such efforts have typically assigned a fixed priority to a task and have not been concerned with maintaining a desired or promised service level objective (SLO). For example, resource allocation tools exist that distribute CPU cycles based on the number of shares assigned to a project (e.g., to a group of processes or tasks grouped as a project), with the project being assigned to a pool of computer resources. Unfortunately, the meaning or value of such shares varies over time as more and more projects are assigned to the pool (e.g., the shares may become watered down as more projects and their associated shares are added to the resource pool), which often results in varying levels of service for a project over time. This can result in unpredictable and unacceptable poor service levels and makes it difficult to safely achieve reductions in cost through consolidation. The safe alternative is to acquire additional capacity, which increases costs.

While significant steps have been made in the area of compute resource management, there continues to be a need for improved methods of managing compute resources to enhance the utilization of servers and other compute resources such as CPU, network I/O, and RAM and to better serve the needs of computer system users, e.g., to better allow an administrator to set management policies or goals such as based on client requirements.

SUMMARY OF THE INVENTION

The present invention addresses the above problems by providing a method (and corresponding software and hardware components) for providing more effective management or allocation of compute resources to an application or other components that make up a "workload," i.e., by providing an improved workload manager. This is an open-ended mechanism to define applications' relative importance, express their rates of progress in business terms rather than only in resource consumption terms, and to assign computer resources on the basis of policies that weight applications' relative importance and progress in completing their workloads. The inventor recognized that many operating systems have no mechanisms to dynamically assign resources to applications or workloads based on service level objectives or in a way that yields predictable service levels over varying loads.

For example, prior to the present invention, the Solaris OS provides machine-oriented resource management for a single server, but it is not aware of and cannot assign resources based on service level objectives (SLOs). For example, a Solaris administrator may specify project CPU shares based on the assumption that they know or can estimate the number of shares (or priority) needed to meet service objectives under different loads. However, without implementation of the workload manager concepts described herein, Solaris does not have facilities for managing resources across servers or for determining if a workload is meeting its externally defined SLOs. As a result, workloads often cannot be assured predictable service levels using a priority or share process alone because as workloads start, end, or move in and out of idle or I/O wait status, the amount of CPU time delivered to a project with a given number of shares varies. Presently, the share value is held constant and the service level is allowed to vary, which can result in SLOs not being met for a client. The workload manager concepts of embodiments of the invention instead allow the shares (or priority) assigned to a particular workload to vary to meet one or more set SLO for a workload (e.g., to meet a constant or set SLO for a particular application or set of applications). In brief, the workload manager deterministically allocates resources to an application (or to a workload) over varying load conditions based on service level objectives or on SLO-based goals, which may be periodically set by an administrator or by a client.

More particularly, a resource allocation method is provided for efficiently allocating compute resources such as processor usage among workloads in a computer system. The method includes providing a workload manager in the computer system and then, installing a workload in the computer system. Typically, during the installing, a service level goal is provided to the workload manager for the workload, and the workload manager acts to assign a first resource allocation for the compute resources to the workload. Then, the method continues with determining a service level for the workload in the compute resources, such as by the workload manager processing monitored data from the compute resources obtained by a tracing tool or other monitoring tool. Based on results of the comparing, the workload manager reallocates the compute resource with the workload manager including assigning a second resource allocation for the compute resources to the workload. The workload may be made up of one or more applications running on the compute resources over a single or multiple OS instances. The installing of the workload may include the application interfacing with the workload manager to provide the service level goal, whereby the service level goal is an installation-specified goal.

DETAILED DESCRIPTION OF THE PREFERRED EMBODIMENTS

The present invention is directed to methods and systems for providing improved management and allocation of computer/network system resources to "workloads" to more fully utilize the compute resources. Significantly, the methods and systems described herein manage the resources based on service level objectives or goals rather than by setting a fixed priority or user CPU share to meet peak needs of a workload. The term "workload" may be a single application running on a set of compute resources or a resource pool or may include more than one application or be a process, task, or other grouping for which it is useful to assign a service level objective or goal. In a Solaris-based embodiment, for example, a workload may be a Solaris project or zone that is named in memory such as in a workload manager repository or the like.

The workload management systems and methods of the invention allow a user or administrator to set service level goals for one or more workloads on one or more operating system (OS) instance and one or more hardware platforms and, then, operate to trace or monitor delivered or achieved service levels for the workloads and to dynamically adjust the relative resources available within the resource pool to better meet the set service level goals or to at least report when such goals are not being satisfied.

To practice the invention, the computer and network devices, such as those used to provide compute resources or pools and/or to run applications, workloads, and the workload managers of the invention, may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources may generally be disk devices that may implement RAID or other storage techniques and that may use SCSI and other I/O, data transfer, and storage protocols but the invention is not intended to be limited to the exemplary embodiments. The workload manager of the invention may be implemented as an added or complementary component to existing (or later developed) resource allocation and control tools and devices such as the DTrace and Fair Share Scheduler tools available from Sun Microsystems, Inc. in Solaris systems or other tools that are useful for determining progress of workloads (e.g., completion of tasks or events in workloads), determining service levels being provided to a workload, and allocating compute resources in a scalable manner.

Figure 1:
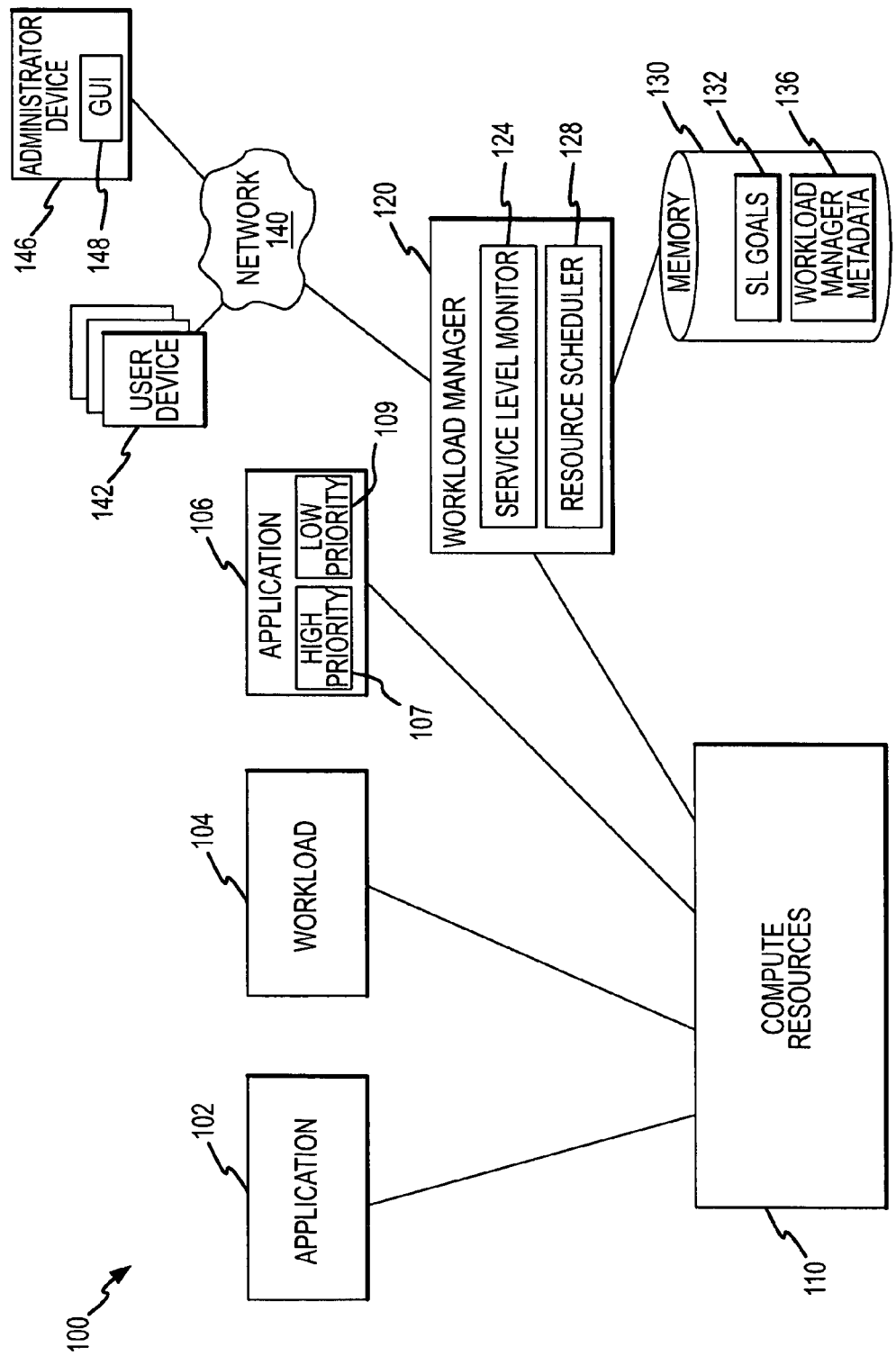
FIG. 1 illustrates a simplified block diagram of a workload management system of one embodiment of the invention.

FIG. 1 illustrates a relatively simple workload management system 100 according to the invention. As shown, the system 100 includes an application 102, a workload 104 (i.e., which may be an application or more/less than an application), and an application 106 that are running in system 100 using compute resources 110. The application 106 differs from the application 102 in that it includes a high priority portion 107 and a low priority portion 109, and as is described below, these portions 107, 109 of application 106 may have differing SL goals 132 and be allocated computer resources 110 by workload manager 120 in a differing manner based on these differing goals 132. The compute resources 110 may take many forms to practice the invention, and generally, are intended to represent any scalable/allocable operating system and hardware such as computer devices and components including CPU, disk, network I/O, memory (e.g., RAM), and the like and may be provided in hardware devices such as servers, disk data storage devices, and other devices developed in the computer industry for running applications (such as devices supporting N1 initiatives by Sun Microsystems, Inc., distributed computing, virtualization, and the like where an application or workload is not limited to a single device(s) or machine(s)).

The system 100 also includes a workload manager 120 that is in communication with the compute resources 110. A service level monitor 124 is provided to monitor progress of applications 102, 106 and workload 104 in compute resources, and in one embodiment, a service level for each application/workload 102, 104, 106 that is not idle is determined periodically or based on event completion by the service level monitor 124. A number of tools can be used to provide the monitor 124 and in one embodiment, DTrace from Sun Microsystems, Inc. is used to give observability into applications/workloads 102, 104, 106 and for determination of service level goal achievement by the workload manager 120. DTrace is a technology available from Sun Microsystems, Inc. and introduced with the latest version of the Solaris operating system, and this workload manager leverages its novel features for a new type of instrumentation previously unavailable in computer systems. Specifically, DTrace makes it possible to associate a system event with an arbitrary program to be invoked when that event occurs. This invention makes use of this capability by having a workload manager subroutine called at the beginning and end of a managed transaction. This is a new and novel way to measure computer application progress and can be generalized to many workloads.

For example, consider workload management for web applications. Such applications process transactions, often called "web hits", according to a protocol that is externally visible via DTrace and which this invention can now use as a basis for instrumentation. Here, a web transaction/application 102 may be defined as starting when the first byte is read from the port 80 socket and ending when the first byte is written on that socket, and this kind of behavior is externally visible via the monitor (which may comprise DTrace or the like) 124. Instrumentation may be provided via the manager 120 and provided to a user device 142 via network 140 or more commonly, to a dashboard or GUI 148 on administrative device 146. Instrumentation for a wide range of standard applications 102-106 with known behaviors that can be traced or monitored via monitor 124 may be provided by the workload manager 120 and graphically or otherwise displayed to an operator on the GUI 148 or user device 142. Many well-known applications, such as databases, mail servers, message handlers, and others, exhibit stylized behavior that can now, finally be instrumented on the basis of the number of transactions they process in a given time interval rather than based on the amount of compute resources provided to them. For example, a library of well-know applications (not shown) can be provided in the memory 130 for use by the monitor 124 and the workload manager 120 in determining service level or progress of applications/workloads 102-106 in the compute resources 110 (e.g., a dynamic resource pool or collection of physical assets such as CPU, I/O, and RAM).

Sun Microsystems, Inc., other vendors, and customer programmers will be able to add to this library using this generalized capability, which is based on describing an application's behavior (such as when it reads or writes data at transaction boundaries) rather than changing application behavior. This is also a unique characteristic of the described method and system because existing computer systems today do not permit application monitoring without modifying application program code. Vendors and customers resist making such changes due to the cost of program changes and need to test and validate the updated program. This invention bypasses this obstacle by making it possible to instrument applications based on their behavior. An application programming interface that names transactions and marks transaction begin and end can be used for new applications or existing applications whose owners are willing to make such changes, but is not mandatory.

The system 100 includes memory (or WLM repository) 130 that stores service level (SL) goals 132 and other metadata 136 used by the workload manager 120 in managing resources 110 for applications/workloads 102-106. In some embodiments, the SL goals 132 are set or tunable by users via user device 142 or via administrative device 146, and in other cases, a system administrator operating the device 146 inputs the SL goals 132 via GUI 148 to provide desired service levels to applications/workloads 102-106 with resources 110. The SL goals 132 may take a number of forms to practice the invention, and these are described in detail below. Briefly, though, SL goals 132 are typically associated with a particular application 102, 106 or workload 104 and may even be associated with a portion or subroutine/task within an application (such as high and low priority portions 107, 109 of application 106). The SL goals may, for example, set CPU seconds per minute (i.e., CPU usage) when an application is not idle, set minimum I/O operations per second, set a minimum number of transactions of a particular type per unit time (e.g., per second) and/or set a percent of transactions in an application or workload that are to be completed per unit of time. This capability will let customer installations enforce their workload's SLOs in a direct rather than indirect manner, with a rule set that requires, for example, that a given workload complete 95% of its transactions in 1 second time while completing 1,000 such transactions per second.

In some preferred embodiments, the SL goals 132 are provided during installation of an application or workload 102, 104, 106 rather than being preset/pre-established for the system 100. For example, in one embodiment, the SL goals 132 for an application are installation specified through an API (not shown) to the workload manager 120 such as via scripting. In particular, the API may be used to declare transaction(s) start and end points. A managed application 102, 104, 106 may own several SL goals 132 that are established during installation. For example, a CPU usage and an I/O performance may be set (or a memory usage or other SL goal), and when either of the goals is not being satisfied based on data gathered by monitor 124, the workload manager 120 acts to reallocate (or perform remediation) the compute resources 110 to better meet the goals 132. In other words, the goals 132 are generally kept constant (although they may be set for time periods during a day or be later changed/tuned by an administrator or user/owner of the application) while the allocation of resources are changed. For example, the priority "shares" or portion of CPU, I/O operations, memory, or the like may be increased for an application that is not meeting its SL goals 132 (or is approaching a point at which it will not be meeting its SL goals 132 as it may be desirable to set reallocation/remediation points at a certain bound or tolerance below the set goal to better avoid missing goal achievement).

The workload manager 120 includes a resource scheduler 128 that acts to allocate and/or schedule the use of compute resources 110 by the applications/workloads 102-106. Such allocation may be done in a number of ways, and in some embodiments, the workload manager 120 provides priorities and other settings such as "shares", which may be stored in its metadata (along with monitored data from monitor 124 and service level determinations), to the scheduler 128. The resources scheduler 128 uses these priorities/shares in allocating the compute resources 110. For example, the scheduler 128 may comprise the Fair Share Scheduler provided by Sun Microsystems, Inc. or a similar tool to handle allocation of resources 110 based on resource usage settings provided by the workload manager 120. In one particular case, the workload manager 120 compares SL goals 132 to progress or achieved service levels for a particular application 102-106 (or application subpart) and when goals are not being met (or nearly not met) the workload manager 120 acts to change the usage settings such as by increasing the number of CPU or other resource shares, and then, the share-based resource scheduler 128 acts to distribute CPU cycles or other resource usage based on the new relative shares assigned to the application 102, 104, or 106.

Figure 2:
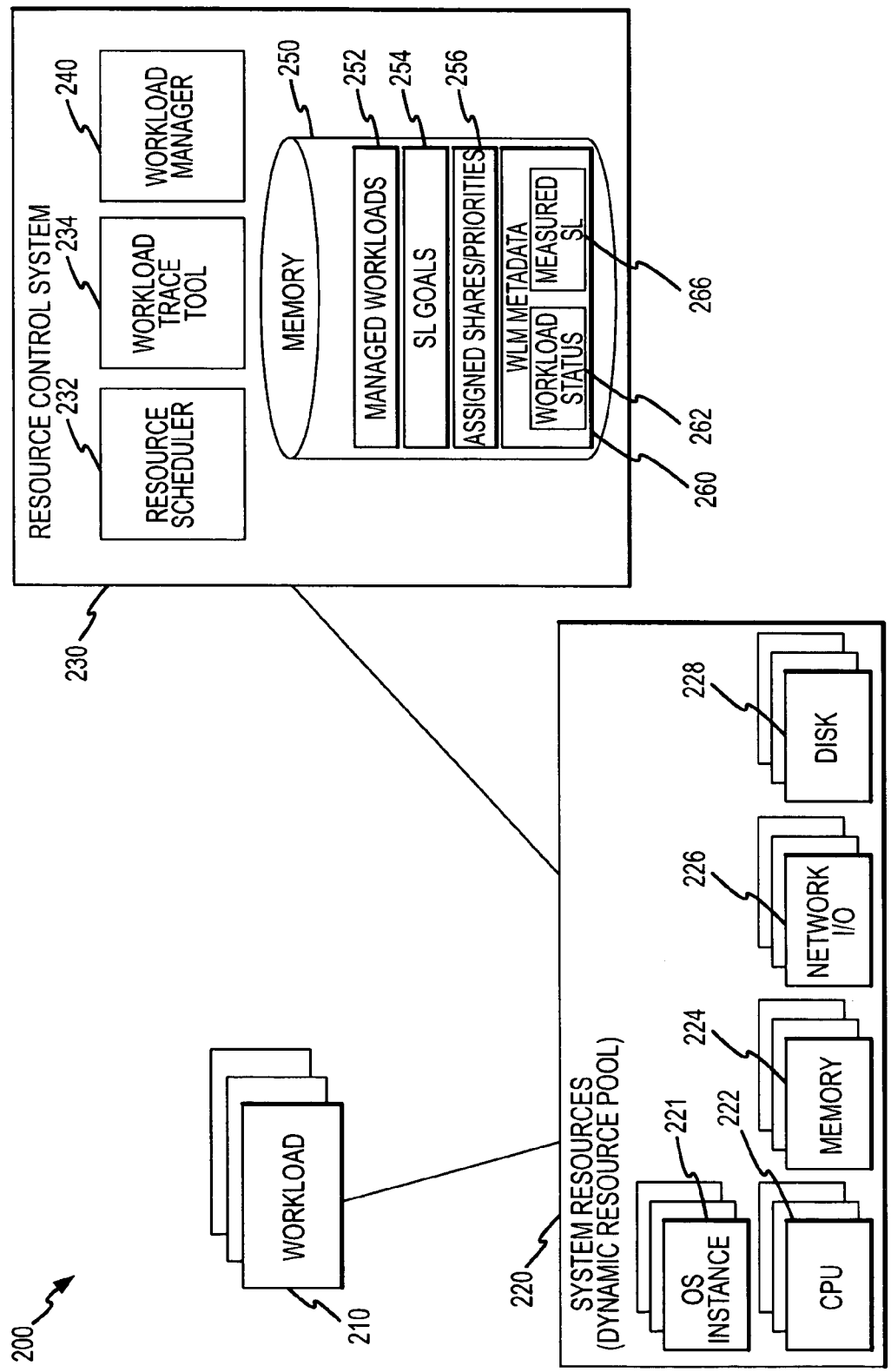
FIG. 2 illustrates another embodiment of a computer system or network utilizing a workload manager of the invention in conjunction with other resource control or management tools to allocate system resources to meet or based on service level objectives or goals.

FIG. 2 illustrates another embodiment of a workload management system 200. The system 200 includes a plurality of workloads 210 that are run on and/or make use of system resources 220 (e.g., a dynamic resource pool or pools). Within the system resources 220, multiple OS instances 221 are provided and the workloads 210 may be distributed across one or two or more of these OS instances 221. The resources 220 are shown to include CPU 222, memory 224, network I/O 226, and disk 228, and one or more of these resources can be dynamically allocated to the workloads 210 by a resource control system 230 that communicates with (i.e., monitors and manages) system resources 220.

The resource control system 230 is configured to show that a workload manager 240 can be added to or included in the control system 230 (or provided in a separate system that communicates with system 230) to build on and work in conjunction with more typical resource control components. For example, the resource control system 230 may include a resource scheduler 232 and a workload trace tool 234. The scheduler 232 allocates components within the resources 220 based on assigned shares and/or priorities 256 stored in memory 250. These shares/priorities 256 may be established and then adjusted by the workload manager 240 (or based on input/instructions from the manager 240). The workload trace tool 234 functions to make progress of workloads 210 in pool 220 observable by the workload manager 240, and the workload status 262 may be stored in workload manager metadata 260 in memory 250. The workload status 262 may provide state information (non-idle, idle, bound, and the like) as well as progress information. The workload status 262 may be used by the trace tool 234 or by the workload manager 240 to determine a measure service level (SL) 266 for each of the workloads 210.

The workload manager 240 may include an interface or API that allows a subset of the workloads 210 to be defined as managed workloads and the names of these workloads are stored in memory or WLM repository 250 as shown at 252 (with the other workloads 210 being unmanaged workloads that are administered manually or the like). At installation with a script via the API or later via a GUI or the like, one or more service level (SL) goals 254 is set for each of the managed workloads 252 (in some cases, default SL goals 254 may be set for workloads 210 that do not have defined SL goals).

During operations, the workload manager 240 at least periodically compares the measured SL 266 for a workload 210 identified as managed at 252 with the SL goals 254 associated with a managed workload 252. If goals are not being met, the workload manager 240 may simply report this issue to an administrator of the system 200 or owner of workload 210, or more typically, will initiate reallocation or remediation to adjust or increase the assigned shares/priorities 256 for the workload 210 that is not achieving its goals. In some cases, this will involve adjusting or decreasing the assigned shares 256 of workloads 210 that are meeting their goals. For example, if a workload is exceeding its SL goals 254 by a preset margin, the workload manage 240 may take shares from that workload 210 and transfer them to the workload 210 that is not achieving its SL goals 254. In other cases, the number of shares is not fixed and shares can simply be added to the underperforming workload 210 to reallocate the resources 220.

Figure 3:
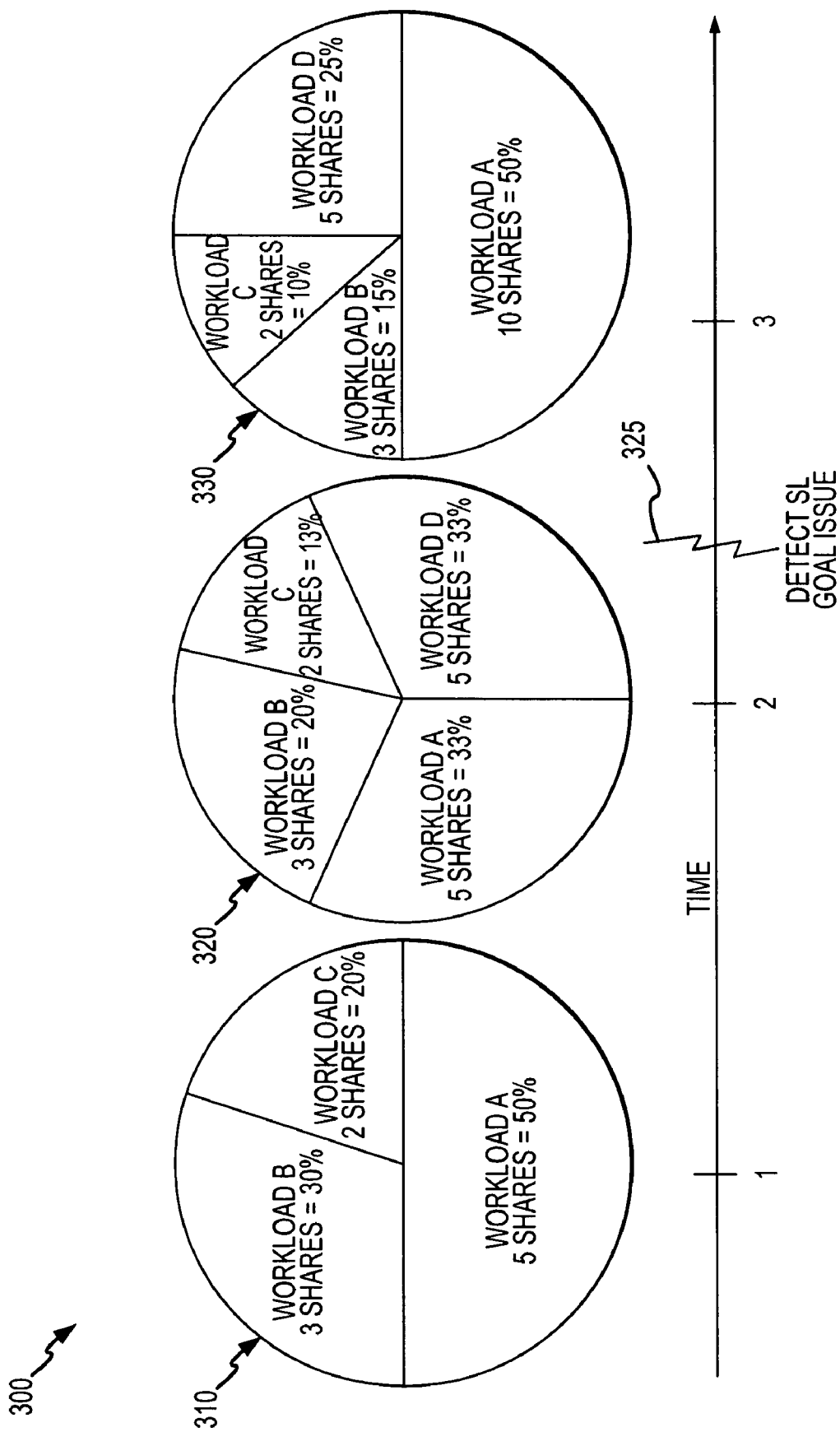
FIG. 3 is an exemplary remediation or reallocation process taken to satisfy a service level object or goal such as may be implemented by operation of the systems shown in FIGS. 1 and 2.

An example of how such monitoring and remediation/reallocation by a workload manager may be provided is illustrated in FIG. 3. The graph 300 illustrates assigned resource usage, such as for CPU cycles in a dynamic resource pool, that are assigned shares (i.e., shares are used to indicate a priority of a workload). As shown at 310, workload A is assigned 5 shares, workload B is assigned 3 shares, and workload C is assigned 2 shares. At Time 1, this share assignment results in a split of the resource or resources capacity of 50 percent, 30 percent, and 20 percent, respectively. At Time 2, however, a workload D is added that is assigned 5 shares (i.e., has an equal priority as workload A), and this resource allocation results in CPU or other resources being assigned at 33 percent for workloads A and D, 20 percent for workload B, and 13 percent for workload C. In other words, the addition of an additional workload has resulted in the dilution in value of the previously running workload shares. In prior systems, the shares are held constant and this dilution is allowed (i.e., shares are assigned initially in the hope that the originally assigned shares will allow the workload to be satisfied at its peaks). The opposite is also true with the removal of or state change to idle of a workload resulting in each workload's shares relating to greater assigned resource utilization (which may result in underutilization of resources).

The workload manager of the present invention next uses a workload monitor or trace tool to monitor workload/application progress and to determine service levels that are being provided to one or more of the workloads (e.g., to managed workloads). At 325, the graph 300 shows a point in time where the workload manager determines that a SL goal issue is occurring, e.g., a SL goal is not being met or will soon not be met if conditions continue or worsen. For example, the dilution of share value at Time 2 may result in workload A not achieving one of its SL goals. According to one important feature of the invention, the workload manager reacts to this determination by at least reporting the SL goal issue to a system administrator and/or to the user/owner of the workload. More typically, the workload manager responds to initiate a remediation of resource allocation to assure that workload A meets its SL goal(s). In this case, reallocation may take the form shown at Time 3 with workload A being assigned additional shares (additional resource usage such as additional CPU cycles, additional I/O operations or memory per unit time) while the other workloads are held constant (or reduced) with the assumption that only one SL goal issue is being addressed at Time 3. As a result of the reallocation, workload A now has 50 percent of the resource usage again as in Time 1 and workload B has 15 percent, workload C has 10 percent, and workload D has 25 percent. Such a reallocation results in workload A meeting it SL objective or goal. In some cases, such reallocation may result in another SL goal issue being later detected and the workload manager operates to continue to monitor and take remediation steps as necessary to adjust resource allocation (i.e., share assignment).

With the discussion of FIG. 1-3 understood, it may be useful to further describe workload manager functionality generally. The workload managers in many embodiments have the following capabilities. The manager provides a way to define "managed workloads" and to specify their relative importance (or priority) for resolving contention for constrained resources. The workload manager typically provides a way, such as an administrative interface, for an application/workload or user/administrator to specify different classes of service goals for different workloads. In particular, the workload manager allows multiple ways for specifying a "unit of work" relevant to a managed application. For example, a direct approach may be used such as specifying "CPU consumed per unit of time" (or other resource usage per unit of time). However, there may be more indirect specification methods such as "disk I/O per unit of time" and "increase of a log file per unit of time" that could be used as proxies for measures of useful work. There preferably is also provided in or with the workload manager a method/function to instrument a number of transactions or work units processed per unit of time, e.g., with an API that reports begin and end of a transaction and provides a reporting of such number of transactions. The previously-described method using DTrace to measure transactions start and end based on externally-viewed application behavior is a preferable technique to provide this instrumentation without having to alter applications. This non-intrusive method is one of the significant capabilities of this invention.

The workload manager, as discussed, is configured or adapted to enable specification of goals and constraints for managed applications or workloads. For example, it may be installation-specified that an application be delivered a particular amount or number of CPU seconds per minute when not idle. Or, it may be specified that the workload be provided resources to process a particular number of transactions of a particular type per unit of time, and this goal can be further clarified with a sub or collateral goal such as a requirement that a certain percent of the application or workload's transactions be completed within a given interval. In some embodiments, the workload manager is able to manage work across multiple OS instances (as shown in FIG. 2) within an administrative domain, and this managed work may be controlled (resources allocated) based on a common policy set (e.g., a common set of SL goals and other WLM metadata as needed). The workload manager may further support a web-based dashboard that lets an administrator view the managed workloads and how well they are meeting their objectives (i.e., see GUI of administrator device in FIG. 1 that is driven at least in part by the workload manager).

The workload manager may be implemented in a user-space daemon that uses, for example, Solaris facilities to periodically observe progress of monitored applications and react by adjusting CPU shares (or other resource usage allocation settings) upwards if an application is active yet is not meeting its SL objectives or goals. Workload management may utilize configuration files and reporting may be performed via a servlet-based web interface. Monitoring tools, such as DTrace, may be used to detect and sample application states, e.g., running, waiting, blocked, idle, or the like.

Figure 4:
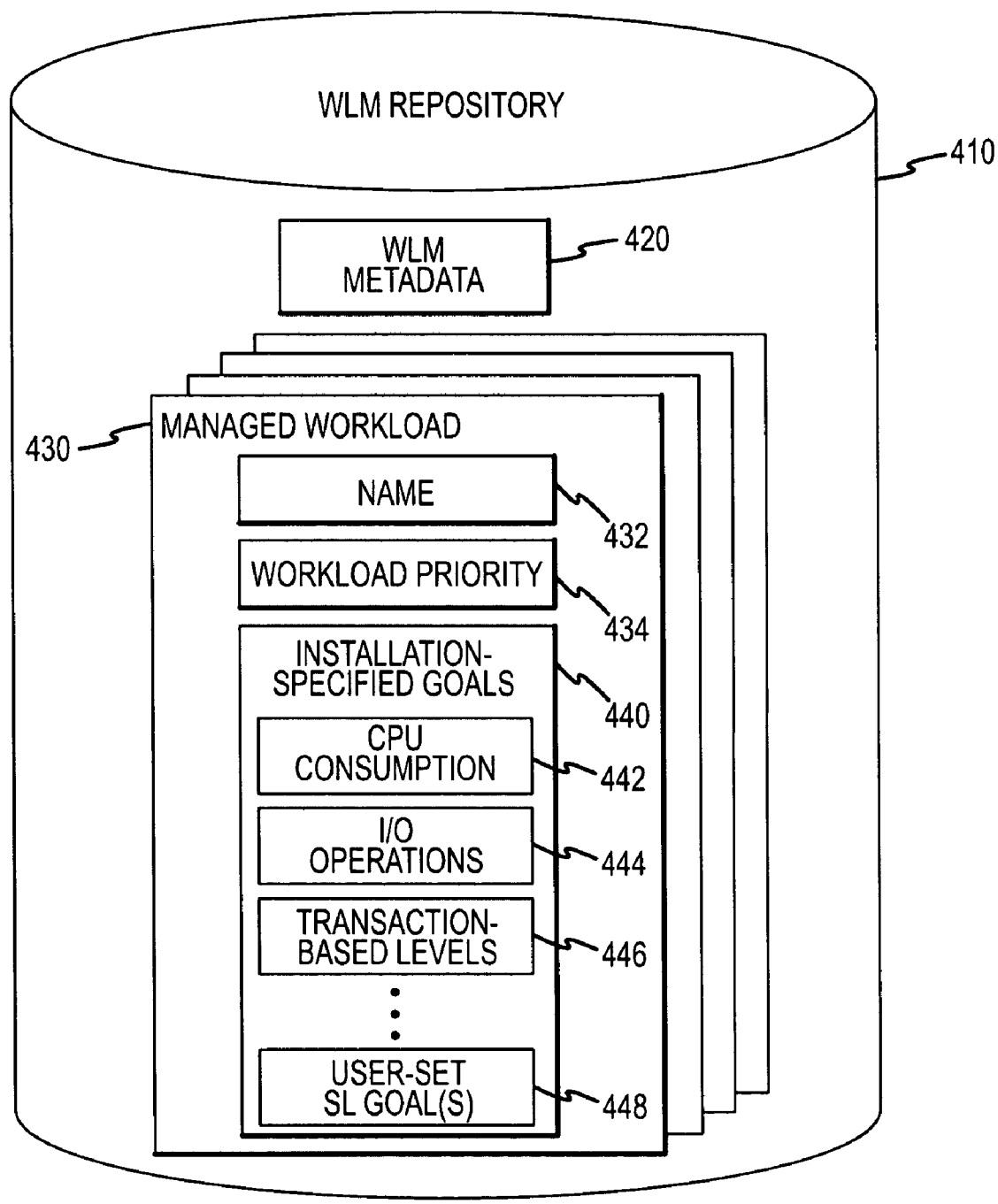
FIG. 4 is an exemplary workload manager (WLM) repository that may be used by workload managers of the invention (such as those in systems of FIGS. 1 and 2) showing one arrangement of data in the WLM repository.

The workload manager of the invention typically will have a workload manager (WLM) repository associated with it for storing information needed for determining progress of managed workloads and/or service levels achieved and also information relative to each managed workload. For example, a WLM repository 410 may take the form shown in FIG. 4. As shown, the repository 410 may store WLM metadata 420 that may include data from a workload progress monitor, such as monitor/trace tool 124, 234 in FIGS. 1 and 2, that indicates for each workload its status and progress (as measured periodically and/or based on event completion). Any other information that is useful in determining provided service levels and for managing workloads may also be stored in metadata 420.

The repository 410 also includes records or files for each managed workload 430. The managed workload file 430 includes a name of the workload 432 (or other identifier) and a workload priority 434. In some embodiments, the file 430 is provided to the repository 410 (and a workload manager) at installation such as by a script. The priority 434 indicates the relative importance of the workload associated with the name 432. The repository 410 also includes a set of installation-specified goals (or otherwise specified as it is sometimes the case that the goals may be modified over the lifetime of a workload) 440. These goals may include CPU consumption 442, I/O operations 444, transaction-based levels 446, user-set SL goals 448, and other resource allocation-related goals (not shown). The repository 410 may include simple text files and may be an external repository (for multi-host configurations) or may comprise an N1-defined service repository or the like.

As can be seen in repository 410, the resource allocation methods of the invention allow managed workloads to be defined that will be under a workload manager's control. Then, their relative importance or priority can be specified for resolving contention for constrained resources. Priorities may be quantified by a workload manager as shares, e.g., to facilitate allocation/scheduling resources such as with a Fair Share Scheduler or other share-based allocation tool, so as to indicate a degree of bias permitted for one workload over another. Unmanaged workloads (i.e., everything not under WLM control) may be left on manual controls. The methods also allow specification of different classes of service goals, i.e., multiple ways to specify a unit of work. For example, units of work may be specified as CPU consumed or disk I/Os per unit of time. Further, work may be defined and goals provided for transactions or work units processed per unit of time (e.g., with an API that reports begin and end of a transaction). The allocation methods described herein also permit arbitrary goals via an extensible, privileged framework. Users of the allocation system can describe goals against these service classes to be attained for each non-idle workload.

In some cases, deadline scheduling may also be defined via the SL goals. For example, an application or workload may be known to have a total resource requirement, e.g., a job takes 30 minutes of CPU and 100,000 disk I/O operations. Then, a "must complete" deadline can be set for the workload/application. The workload manager can compute using its metadata whether the workload can complete on schedule or by the set deadline/goal at current rate of progress (which may be provided by the monitor or trace tool and/or determined by the workload manager using information provided by such tool). If it is determined not possible (e.g., 25 minutes of CPU required but only 5 minutes to go until deadline goal), an error or SL issue may be reported. Additionally or alternatively, the workload manager may act to increase resource allocation (such as CPU share and/or other resources such as disk or network I/O) to attempt to meet the deadline goal for the managed workload.

As shown for application 106 in FIG. 1, the resource management methods of the invention allow a high-priority application to declare it is about to do low-priority work. For example, a project or workload may have an interactive portion (i.e., high-priority portion) and background, compute-intensive portion(s) (i.e., low-priority portions). The workload manager allows separate SL goals to be established for each portion (e.g., at installation) such that the background portion does not have to run at the same high priority as the interactive portion, which could result in starving of other truly high priority workloads. In some embodiments, the API to the workload manager from the application 106 may be used to achieve this functionality with, for example, "begin/end low priority work" calls to the workload manager. Then, during a "low" period, the workload or project runs at specified lower priority (and associated lower resource allocation settings) or lower resource class. This new mechanism solves a problem that has existed in computing systems for several decades; no generally useful workload management solution has previously been defined for the problem of "low priority work done as part of a high priority application", and the only available solutions have been to provide excess capacity, defeating the attempts to reduce computing costs.

Figure 5:
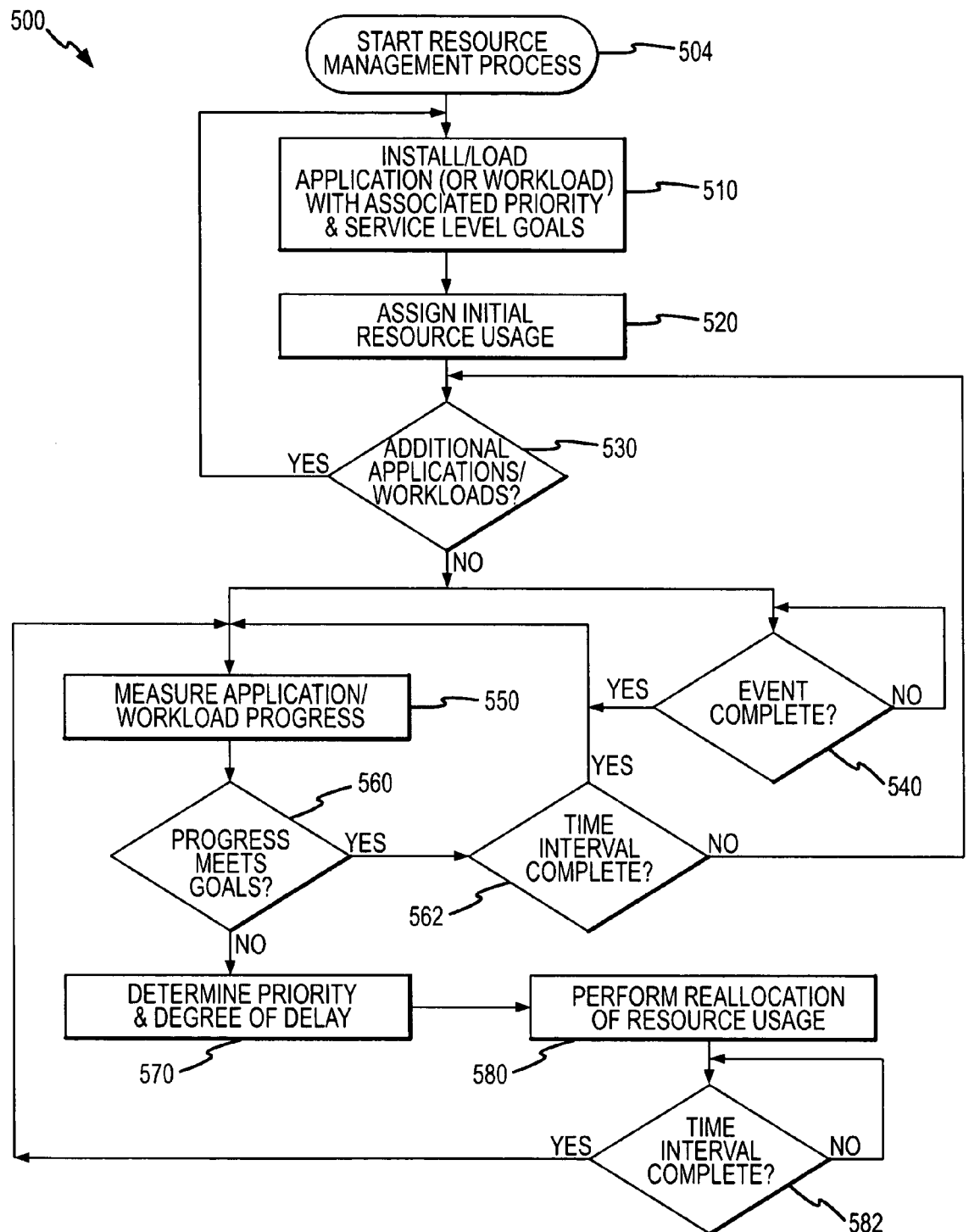
FIG. 5 illustrates an exemplary resource management process utilizing a workload manager that allocates resource usage/rights at least in part based on service level goals.

FIG. 5 illustrates an exemplary resource management process 500 that is carried out using a workload manager as described with reference to FIGS. 1 and 2. The process 500 starts at 504 typically with the loading of a workload manager in a system to be managed such as to be in communication with and work with other system resource controls. The start 504 may also include establishing a WLM repository for use by the workload manager. At 510, an application or workload is installed in the system and as part of this installation (such as a script via the workload manager API), the application indicates its priority and SL goals (i.e., sets associated priority or priorities and SL goal or goals). At 520, the workload manager acts to set or assign an initial resource usage for the newly installed application such as by assigning CPU shares or otherwise setting usage of one or more of the compute resources available to the workload manager and the new application/workload.

At 530, a check is made (or the manager waits) for additional applications, and if there are additional ones, the method 500 continues at 510. Otherwise (or concurrently) the process 500 continues with concurrent process paths. At 540, the monitoring of the progress of the workload is determined based on whether an event related to the workload is completed, and if so, then workload progress is measured based on the event completion at 550. If not, a loop is performed to await an event completion. At 550, the application/workload progress is determined or measured such as based on an event completion or tracing information from a periodic monitoring tool. This information is then used by the workload manager at 560 to determine whether the progress meets the one or more SL goals specified for the workload (e.g., such as by comparison of the progress to set SL goals or classes). If the SL goals are met, then at 562 the method 500 continues with determining whether a time interval defined for checking progress has expired. If not, the method 500 continues at 530 with waiting for additional applications and/or simply looping until an event is completed or the time interval lapses. When the interval expires, the process is repeated at 550 until at 560 when the progress does not meet one or more SL goal for a workload (or a workload portion).

At 570, the workload manager initiates a remediation of resource allocation and this may include determining the priority of the workload or application and the degree of delay. Based on these two criteria, the workload manager acts at 580 to reallocate resource usage to better satisfy the demands of the workload while attempting to continue to meet the needs of other resources based on their relative priorities. For example, if the priority is relatively low and the degree of delay is minor, the reallocation may be relatively small (e.g., a minor shift or increase in CPU shares or the like) while if the priority is high and the delay large, the reallocation may be more significant. The process 500 then continues at 582 (or 562) with determining whether the monitoring interval has expired, and if so, the progress is again measured at 550 and otherwise, a loop may be performed or other steps in process 500 may be completed.

As can be seen from FIG. 5, the use of the workload manager in resource allocation includes the measure of workload progress on an interval basis (i.e., a periodic check) and also (but not required) on an event basis (e.g., as transactions are completed). Through its reallocation methods, the workload manager decides who needs more of the compute resource to reduce their causes of delay and involuntary wait. Resource allocation is evaluated on an interval basis, such as seconds or minutes, to cut overhead and thrashing of resource choices by over reallocation. The workload manager may be placed (in some embodiments) in a passive or observe mode where it does not make changes automatically but instead reports issues and/or indicates what the workload manager would have done to reallocate resources based on measured progress and SL goals. Goals are typically addressed in order of priority and degree of delay (but may be addressed differently such as by predefined reactions to missed SL goals with preset changes in resource usage assignments). For example, the workload manager determines how important a workload is and how far it is behind a goal schedule, and this may involve sorting by a product of a constant times a workload priority over a constant times a percent of goal achieved with the two constants being used to adjust weights given to priority versus delay.

The workload manager may be also used for sampling state to accumulate statistics (WLM metadata) on how often a managed workload is delayed and why, and these can be reported to a system administrator. This can be used to answer the question of what are the delay factors impeding a particular workload, and this can be sorted in descending order of percent delay. For example, the DTrace monitoring tool provides methods to expose such data that can be aggregated and processed by the workload manager. Typically, the sample interval should be tunable to allow capping of overhead imposed by the workload manager. A default interval may be set based on system type and typically will be set as interval in seconds with an option to set as a percent of overhead to cap its expense in CPU cycles. These specifications will be stored in the WLM repository as with the SL goals.

The workload manager may be constrained to prevent runaway feedback loops. These constraints can be used to prevent fruitlessly raising shares for an idle application or misidentified progress issue/constrain on workload SL. For example, an administrator may specify minimum and/or maximum limits that constrain WLM settings, such as a cap on maximum CPU that the workload manager can consume.

In some cases, the workload manager also acts to proactively reduce resource allocations to workloads that are exceeding their SL goals by a predefined margin or amount to better utilize compute resources. In some cases, the manager acts to adjust only one workload per management/monitoring interval or cycle and in other cases, the manager adjusts multiple workload allocations.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A method for efficiently allocating compute resources, comprising:

providing a workload manager in a computer system;

installing a workload in the computer system, wherein the workload comprises an application to run on the compute resources, wherein during the installing a service level goal is provided to the workload manager for the workload, wherein the installing of the workload comprises the application interfacing with the workload manager to provide the service level goal, whereby the service level goal is an installation-specified goal, wherein along with the service level goal the application further declares a transaction start and end for use by the workload manager in monitoring progress of the application in the compute resources;

assigning a first resource allocation for the compute resources to the workload with the workload manager, the first resource allocation being used in the computer system to allocate use of components of the compute resources shared with other workloads;

determining a service level for the workload in the compute resources;

comparing the determined service level with the service level goal with the workload manager; and based on results of the comparing, reallocating the compute resource with the workload manager including assigning, to the workload, a second resource allocation greater than the first resource allocation for the compute resources when the determined service level is not meeting the service level goal.

2. The method of claim 1, wherein the service level goal comprises the workload receiving processor seconds per unit of time when not idle and the determining of the service level comprises tracing the workload in the compute resource to determine processor allocation for the workload.

3. The method of claim 1, wherein the service level goal comprises the workload performing a number of input/output (I/O) operations per unit of time and the determining of the service level comprises tracing I/O operations for the workload in the compute resources.

4. The method of claim 1, wherein the service level goal comprises the workload processing a number of transactions of a particular type per unit of time and the determining of the service level comprises tracing completion of workload transactions in the compute resources.

5. The method of claim 1, wherein during the installing of the workload a priority for the workload is provided and wherein the reallocating of the compute resources by the workload manager is performed based on the comparing and the priority compared with other workloads accessing the compute resources.

6. The method of claim 1, wherein the workload comprises the application with a high priority portion associated with the service level goal and a low priority portion associated with an additional service level goal, the workload manager performing the assigning of the first resource allocation for the compute resources such that a smaller amount of the compute resources are allocated to the low priority portion than to the high priority portion.

7. The method of claim 1, wherein the determining of the service level for the workload is performed periodically or when an event related to the workload is completed in the compute resources.

8. The method of claim 1, wherein the first resource allocation comprises a first number of shares of one or more components of the computer resource and the second resource allocation includes a second number of shares that differs from the first number of shares.

9. The method of claim 8, wherein the second number of shares is greater than the first number of shares when the comparing indicates the determined service level is less than the service level goal by a first predetermined amount and wherein the second number of shares is less than the first number of shares when the comparing indicates the determined service level exceeds the service level goal by a second predetermined amount.

10. A method for allocating computer resources to applications, comprising:

providing a pool of computer resources including processor cycles;

providing a workload manager mechanism for allocating the processor cycles to the applications;

storing in memory a workload manager registry including a priority associated with each of the applications and a service level goal for each of the applications, wherein the storing comprises each of the applications interfacing with the workload manager to provide the service level goal, whereby the service level goal is an installation-specified goal, wherein each of the applications comprises a high priority portion associated with the service level goal and a low priority portion associated with an additional service level goal;

operating the workload manager to provide usage allocations for the processor cycles to each of the applications based on the priorities and the service level goals, wherein the workload manager provides usage allocations to each of the applications such that a smaller amount of the compute resources are allocated to the low priority portion than to the high priority portion;

monitoring progress of the applications;

with the workload manager, comparing the monitored progress for at least one of the applications to the service level goal for the at least one application; and based on the comparing, changing the usage allocation with the workload manager for the at least one application using the priority of the at least one application.

11. The method of claim 10, further comprising storing in memory an additional service level goal for the at least one application, and wherein the comparing comprises comparing the monitored progress with the additional service level goal and performing the changing of the usage allocation when either of the service level goals for the at least one application are not met by the monitored progress.

12. The method of claim 10, further comprising reporting the monitored progress, the service level goal of the at least one application, and the usage allocation to a node communicatively linked to the workload manager.

13. A resource allocation system, comprising:

a hardware processor;

a storage memory storing service level objectives for a plurality of workloads;

a resource scheduler provided by operation of the hardware processor in communication with compute resources, wherein the resource scheduler operates to allocate one or more of the compute resources based on assigned usage allocations;

a monitoring tool in communication with the compute resources tracing progress of the workloads in the compute resources;

a workload manager, provided by the hardware processor, assigning, and later modifying, the usage allocations to the workloads based on the service level objectives and the traced progress without modifying components of the compute resources, wherein the workload manager comprises an application interface and the workload manager uses the application interface to receive the service level objectives during installation of the workloads, wherein along with the service level objectives the workload manager further receives a transaction start and end for use by the workload manager in tracing progress of the workloads in the compute resource, and wherein the workload manager compares the traced progress to the service level objectives for at least one of the workloads and increases the usage allocations for the at least one of the workloads when the any of the service level objectives associated with the at least one of the workloads is not satisfied.

14. The system of claim 13, wherein the usage allocations comprise a number of CPU shares and wherein the resource scheduler allocates CPU cycles to each of the workloads based on each of the workloads relative CPU shares.

15. The system of claim 13, further comprising a user interface driven by the workload manager to report the service level objectives, the traced progress, and the usage allocations for the workloads.

* * * * *